Patented July 6, 1926.

1,591,364

UNITED STATES PATENT OFFICE.

ALFRED H. COWLES, OF SEWAREN, NEW JERSEY, ASSIGNOR TO THE ELECTRIC SMELTING & ALUMINUM COMPANY, OF CLEVELAND, OHIO, A CORPORATION OF OHIO.

PROCESS OF PRODUCING ALUMINA, ALKALI, AND DICALCIUM SILICATE.

No Drawing. Original application filed November 20, 1915, Serial No. 62,486. Divided and this application filed May 17, 1920. Serial No. 382,067.

The object of the invention is to furnish a process for obtaining from silicious materials or mixtures the constituents that form alkali metal aluminate from which alumina, and caustic alkali or alkali metal carbonates may be separated. At the same time there is secured a residue, or insoluble product, that can be employed in the manufacture of sand-lime bricks, in lieu of lime, and some silica; or in the manufacture of cement, by the addition of one molecule of lime to the calcium oxide therein.

This case is a division of my application Serial Number 62,486, filed November 20th, 1915 (Patent No. 1,508,777, granted September 16, 1924).

The substances to be treated can be any mixture, natural or artificial, which when charged in a furnace shall give a sintered or fused product containing, as closely as can be attained, such proportions of oxides as shall be equivalent to the molecular weight of two molecules of an alkali earth oxide (preferably lime CaO) to one molecule of silica ($SiO_2$), and less than one and seventy-six hundredths molecules of an alkali metal oxide ($Na_2O$ or $K_2O$) to one molecule of alumina ($Al_2O_3$). The presence of iron oxide, titanic oxide and some others, does not interfere with the process; they may, or may not be present, since they are practically insoluble under conditions of leaching to be hereafter described. If alkaline earth oxides are present as constituents or impurities in the above minerals or mixtures, they can be allowed for in forming the mixtures. Iron oxide acts as a base in relation to the silica, and to the extent that it so acts it should be allowed for by lessening the molecular proportion of lime.

In making my invention I have availed myself of the known fact that if two molecules of soda ($Na_2O$) and two molecules of lime (CaO) are combined with one molecule each of the acid compounds alumina and silica or very nearly in that ratio, there is formed by sintering or fusion a product from which nearly all of the dialkali, for example, di-sodium aluminate ($Na_2O$ $Al_2O_3$) can be leached away from the orthosilicate of calcium ($SiO_2$2CaO) or di-calcium silicate. (See U. S. Patent No. 708,561, of Sept. 9th, 1902 to Kayser). And I have discovered that from a previously sintered or melted mixture I can successfully leach away alkali aluminate when the molecular weight ratio of alkali oxide, $Na_2O$ or $K_2O$ to alumina ($Al_2O_3$) molecules is considerably lower than one and seventy-six hundredths molecules of alkali oxide to one molecule of alumina in the solution, leaving the di-calcium silicate, or orthosilicate of calcium ($SiO_2$CaO) as the residue containing small amounts of alumina and alkali metal oxide and insoluble impurities such as iron oxide, etc. The liquor that I thus secure is a solution of alkali aluminate much more suited for the manufacture of pure alumina and pure alkali than that obtained by the employment of one and seventy-six hundredths molecules of alkali to one of alumina. In order to accomplish this result, it is desirable that the sintered product, which is secured, should immediately be leached and not given time to absorb carbonic acid and water from the atmosphere. With this precaution taken, a ratio of sodium oxide, for example, and alumina in the sintered mixture containing as low as 1.1 molecules of sodium oxide ($Na_2O$) to one molecule of alumina has been leached by me and very satisfactory results secured, though the leaching is somewhat more rapid, if the alkali oxide be slightly increased (but it should not be increased to approximate one and seventy-six hundredths molecules of alkali metal oxide to one molecule of $Al_2O_3$ in the solution). The solution then of low ratio becomes one of superior value for use in separating the alumina from the alkali, following the lines of the well-known Bayer process. See U. S. Patents 382,505 of May 8, 1888, and 515,895 of March 6, 1894. This process, as is well known, produces alumina of the highest purity and in a form to be readily washed and left free from caustic soda, or carbonate of soda, the presence of which impurities greatly decreases the value of the alumina produced for the manufacture of the metal aluminum. Herein lies the great and important use for alumina.

In operating the Bayer process, the larger the percentage of alkali in the alkali metal aluminate solution, the slower the process, and the less the proportion of alumina that separates from the solution during standing, or during agitation of the solution. Therefore the alkali aluminate solution should be as low in alkali content as is consistent with the previous leaching process involved in securing it. Two molecules of alkali metal oxide to one molecule of $Al_2O_3$ is too high. The $Al_2O_3$ that will voluntarily precipitate becomes only one-half as much as when one molecule of $Na_2O$ or other alkali metal oxide to one of $Al_2O_3$ is present under like conditions of temperature and density of solution. The liquor left after precipitation of alumina by the Bayer process contains from 5 to 7 molecular weights of $Na_2O$ to one molecular weight of $Al_2O_3$. The less the quantity of this liquor, the less reagent is required to remove the $Al_2O_3$ and produce a pure caustic solution. If the liquor is of twice the quantity, as when two molecules of sodium metal oxide to one alumina are used, then twice the $Al_2O_3$ remains with the liquor, and twice the reagent is required for precipitation, and the quantity of the material thus precipitated and which must be retreated leads to prohibitive costs and additional losses. Herein lies the importance of employing in the mixture that I charge to a furnace a smaller ratio of alkali metal oxide to alumina than that mentioned in the above referred to patent to Kayser and in my published papers of 1912 before the Eighth International Congress of Applied Chemistry, volume 25, page 119 and before a Joint Meeting of the American Electrochemical Society, etc., printed in the Journal of Industrial and Engineering Chemistry, volume 5, No. 4, April 1913.

Having thus described my discovery and set forth the advantages gained thereby over what is well known in the chemistry of the art, I will now describe how the invention and its discovered application may be employed.

I take an alkali silico aluminate such as leucite, orthoclase or zeolite, or mixed materials containing an oxide of an alkali metal and $Al_2O_3$ and $SiO_2$, and determine their exact chemical composition. They may be made artificially from salt, clay and steam by methods described in patents already issued to me (Nos. 1,040,893 and 1,040,894, dated October 8, 1912, 1,123,693 dated January 5, 1915, and to Kayser and Cowles No. 1,041,599 dated October 15, 1912), or they may be secured as minerals, or their equivalents may be secured by mixtures of minerals that occur largely in nature, with alkali metal carbonates. It is desirable to select such minerals as will enable one to secure an alkali metal-silico aluminate that contains as low an amount of silica as is practically securable, for, when the mixture is made for treatment, there must be proportioned to each molecule of silica in the mixture two molecular weights of calcium oxide, or its equivalent calcium carbonate, etc. The lower the silica contents, the less the calcium oxide needed, and the less bulky is the final product to be leached.

An artificial sodic-silico-aluminate of the composition $$(Na_2O)_{1.4}2SiO_2.Al_2O_3$$

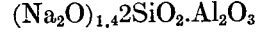

made by me on a large scale, and containing but two molecules of silica, works well. To this mixture 4 molecular equivalents of lime, or calcium carbonate must be added in preparing the mixture for sintering.

The mineral "leucite", quite common in nature has, when pure, the formula $$K_2OAl_2O_34SiO_2.$$

This mineral should be ground with eight molecular equivalents by weight of lime (CaO) to each four molecular equivalents by weight of silica in its composition. To prepare this mixture for sintering, it is desirable to add substantially less than seventy-six hundredths and more than one-tenth of an alkali metal carbonate molecule, or its equivalent to each molecular weight of $K_2O$ in its composition, when excellent results will be attained.

In case a mixture of clay and calcium carbonate, sodium carbonate and silica is used, the carbonic acid is driven off from the calcium carbonate and the alkali metal carbonate, and the mixture should be so formed that the sintered product contains, as nearly as possible, two molecules of calcium oxide to one molecule of silica, in their molecular weight proportions, while the alkali metallic oxide should be preferably sufficiently above the ratio of one molecular weight of alkali metal oxide to one of alumina that the sintered product, even without boiling and at ordinary temperature will freely leach, and that such leaching shall not be interfered with by the absorption of carbonic acid gas from the atmosphere. This ratio should not extend up to one and seventy-six hundredths molecules of the alkali metal oxide to one of alumina for reasons given above. A ratio of 1.5 of alkali metal oxide to one of alumina in the product formed gives good results.

Just in proportion as we increase the ratio, the difficulties of recovering the pure alumina from the sodic aluminate solution greatly increase and render the process one that departs from practical utility, in the manufacture of alumina, in coordination with the Bayer process.

Some of the alkali zeolites are preferable in forming the mixture, to the alkali feldspars, such as orthoclase and albite, since they can be found containing much less silica in their composition than the feldspars. I have found, however, that the process works very satisfactorily upon orthoclase feldspar, the composition of which, when pure, is

$K_2O \cdot Al_2O_3 \cdot 6SiO_2$.

To such a feldspar, again there should be added two molecular weights of calcium oxide, or calcium carbonate to each molecular weight of silica in its composition, and it is preferable to add a fraction substantially less than seventy-six hundredths of a molecule of an alkali metal hydroxide or carbonate to each molecular weight of $K_2O$ in its composition.

If free silica is present in any of these minerals mentioned, sufficient calcium carbonate or lime should be added in excess to allow for such free silica and to combine one molecular weight of it with two molecular weights of calcium oxide.

Having once determined the exact composition of the above minerals, mixtures of them may be employed, since one can always add sufficient calcium oxide, calcium carbonate, or other alkali earth oxide or calcium salts to give in the product two molecular weights of calcium oxide to one molecular weight of silica. It is preferable that there should also be added to the mixture sufficient alkali metal oxide, either as carbonate or caustic, to elevate the ratio of 1 alkali metal oxide to 1 alumina ($Al_2O_3$) sufficiently to facilitate leaching and prevent loss of alumina during leaching of the sintered mixture on account of loss of alkali in furnacing, or by the action of carbonic acid of the air and water, either preparatory to or during the leaching, converting alkali metal oxide or calcium oxide into their respective carbonates. The absorption of carbonic acid goes on very fast, and to the extent that it is absorbed, it lessens the amount of mono-alkali-aluminate that passes into the leach water, especially so when there is no excess of alkali over and above the ratio of 1 alkali metal molecule to 1 alumina molecule. In no case is it necessary to go above one and seventy-six hundredths molecules of alkali metal oxide to 1 molecule of alumina in the solution. If alkaline earth oxides be present in the mineral, or minerals to which lime or its equivalent is added, allowance must be made therefor, and less lime added in order to secure the ratio of two calcium oxide to one silica in the product. Other alkaline earth oxides or carbonates, either in the lime or in the alkali-silico aluminate material, should be treated as though they were calcium compounds in forming the calculation for the mixture. An excess of lime in the mixture results during leaching in the formation of insoluble calcium aluminate, thus interfering with high recovery. On the other hand too much silica in the mixture results in leaving in the residue insoluble hydrated aluminum alkali metal silicate, which interferes with the extraction of alumina in leaching. In all cases the mixture should be ground fine enough so that, according to the length of time it is submitted to heat to secure sintering or fusion it will give a uniformly converted product. Some moisture added to this finely ground mixture is advantageous, especially if the operation is carried on in a rotary furnace, and when there is an alkali carbonate in the mixture, it especially tends to nodulize the mixed materials in the furnace and the lighter dusts are therefore, not blown away. Should it be found in practice that there is more dust of certain materials blown out of the furnace than of others, compensation for this should be made in forming the mixture. The temperature of sintering varies somewhat with the nature of the alkali metal oxide present in the mixture, ranging, when sodium oxide is a compound of the mixture around 1300° C. But with potassium or lithium oxide, the temperature will vary slightly from this, these oxides giving more easily fusible products. At this temperature a friable, porous, non-vitreous sinter is obtained in excellent condition for leaching. The temperature may be raised and the mass fused, and still the product can be very efficiently leached. The charge does not tend to adhere to the lining of a rotary kiln in practice, and works at a lower temperature about 150° C., than in the practice of making hydraulic cement. The raw product from the rotary furnace can be used to spread on the land as a fertilizer.

My process can be used where in the resultant product there is but one molecule of the alkali metallic oxide to one molecule of ortho-silicate of calcium, or di-calcium silicate, which is insoluble and from which the mono sodium aluminate may be leached. When, however, this mixture is used the recovery of alumina, due to loss of alkali in furnacing and to the absorption of carbonic acid during the leaching process, is lessened, as there is not quite enough alkali to combine with all the alumina, and were less than one molecule of alkali metal oxide to one molecule of alumina employed in the mixture, the efficiency of the process increasingly diminishes.

In the Bayer patent of 1894, No. 515,895 the ratio of $Al_2O_3$ to $Na_2O$ is set forth as $1Al_2O_3$ to 1.75 or $1.85Na_2O$. This would imply for my process, in the sintered product ready for leaching the same ratio of alumina to sodium oxide. But, I have found that such is not necessary, and especially so, if in the leaching a lye is employed consisting of a pure caustic alkali, or an alkali containing 5 or more molecules of sodium oxide or potassium oxide to one molecule of alumina. In this case the ratio of $Na_2O$ in the sintered product of alumina can fall below the ratio of one and one. Concerning statements herein relating to adding the carbonate of an alkali to the charge fed to the rotary furnace, it is to be noted that a pure alkali, such as caustic soda, or caustic potash can be used, or even an alkali containing a little alumina, if the whole mix be properly proportioned as to the ratio of two molecules of lime to one molecule of silica. Pure lime works best, and is the cheapest and hence is preferred. It may contain magnesia but when the magnesium carbonate or magnesium oxide is too high, I find that it does not work so well. Hence, of all the alkali earth oxides that are stated to be equivalent to lime, I prefer lime and only such other alkaline earths as work satisfactorily and which do not form, under leaching, an alkali earth aluminate, but do form a di-alkali earth silicate, or ortho-silicate of an alkaline earth. It is when these insoluble di-alkaline earth silicates are formed that the process works at maximum efficiency.

If as a source of calcium oxide in the mixture, I employ calcium chloride and use a lower heat at first passing sufficient steam over the mixture to convert the calcium chloride into calcium oxide, and then elevate the temperature to effect complete sintering, I find, there is a tendency for the alkali metal chloride to pass out of the furnace with the hydrochloric acid fumes. Hence, in this instance, a sufficient quantity of alkali metal carbonate should be added to the initial mixture to leave in the sintered product sufficient alkali metal oxide to permit the leaching out of the alkali metal aluminate.

I have found calcium chloride may be mixed with clay and carbon and subjected to temperatures ranging from 1500° to 2000° F. vapor of water being blown over and through this heated mixture, under conditions where a large surface area of the clay is exposed to the action of the vapor of water and alkali earth salt that the acid radical of said salt will pass off with the fuel gases as HCl and may be condensed and utilized in the production of salts of other bases, or as pure acids, and the product secured as a solid from this step may contain one or more molecules of calcium to one molecule of alumina and two or more molecules of the silica from the clay employed. And knowing the composition of this product, it may be mixed with either or both sodium carbonate and calcium carbonate (or potassium carbonate may be used in lieu of sodium carbonate), so that the ground mixture formed shall contain one molecule of alkali metal oxide or up to substantially less than one and seventy-six hundredths to one molecule of alumina, and two molecules of calcium oxide, or its equivalent to one molecule of silica. The latter ratio should be as exact as the mixture can be proportioned. This mixture may now be preferably passed through a furnace of the rotary type and sintered, preferably at a temperature just below its melting point, in which case there is procured a product from which the alkali metal aluminate is in proper form for leaching, and which will give an alkali metal aluminate best suited for the economical separation of oxide of aluminum of maximum pureness.

I am aware of the Kayser patent mentioned hereinbefore, and disclaim the invention therein disclosed. I am also aware that excessive amounts of sodium carbonate in the presence of lime have been commonly used to form fusions to render silicates soluble in the chemical practice of ordinary analyses. I am aware that calcium chloride in small quantities has been used to nodulize ground feldspar. But, in such work the amount of calcium chloride employed was not sufficient to furnish two molecules of calcium to one molecule of silica in the finished product, and when operated in a rotary furnace, potassium chloride volatilizes away, removing it from the alkali metal oxide aluminum silicate. I am also aware of the process of sintering ferruginous bauxite with excessive amounts of soda carbonate to form sodic aluminate, but here lime was not employed and therefore silicious types of bauxites could not be utilized as in my process. I disclaim each and all of these as being within the range of my invention.

I have leached over eighty-five per cent of the alumina from the sinters above described, and higher percentages can be secured.

Having thus fully set forth my invention and the manner in which it is to be carried out, what I claim is:

1. The process of obtaining sodic aluminate from substances containing soda, lime, alumina and silica, which consists in forming a sintered product containing ingredients in the molecular ratio of one of silica to two of lime, more than one and substantially less than one and seventy-six hundredths molecules of soda to one alumina, and subjecting the sintered product to a leaching process, substantially as described.

2. The process of securing alumina from substances containing lime, silica, alumina and an alkali-metal oxide which consists in forming a sintered mixture containing two molecular weights of lime to one of silica and substantially 1.1 molecular weights of alkali-metal oxide to one of alumina, immediately leaching the sintered product and recovering the contained alumina.

3. The process of forming alkali-metal aluminate, which consists in subjecting a mixture of salts of calcium and clay to a temperature of 1500° to 2000° F., and securing a solid product containing two molecules of calcium oxide to one silica, mixing therewith alkali-metal carbonate in such amount that the ground mixture shall contain not over one and seventy-five hundredths molecules of alkali-metal oxide to one of alumina, sintering in a suitable furnace at a temperature just below the melting point, and leaching out the resultant aluminate.

4. The process of utilizing and producing alkalies and alumina from native silicious minerals and mixtures thereof, which comprises grinding said minerals and subjecting them to a sintering temperature in such proportions that the sintered mixture shall contain between one and one and seventy-six hundredths molecular weights of alkali-metal oxide to one of alumina and two molecular weights of calcium oxide to one of silica, and leaching the resulting product and recovering a solution of alkali-metal aluminates.

5. The process of producing alkali aluminate, which comprises sintering a ground mixture of calcium aluminum silicate and alkali-metal carbonate and silica, the materials being so proportioned that when sintered the product shall contain two molecules of lime to one of silica, one and a fraction ranging from one-tenth to seventy-six hundredths molecules of alkali-metal oxide to one of alumina, and leaching out the contained alkali-metal aluminate.

6. The process of securing alumina from substances containing lime, silica, alumina and an alkali metal oxide which consists in forming a sintered mixture containing two molecular weights of lime to one of silica and substantially one and one-tenth molecular weights of alkali metal oxide to one of alumina, and leaching the sintered product with a watery solution containing several molecules of alkali metal oxide to one of alumina and thus securing a solution containing less than one and seventy-five hundredths molecules of alkali metal oxide to one of alumina and separating alumina from the solution so obtained.

7. The process of securing alumina from substances containing lime, silica, alumina and an alkali metal oxide which consists in forming a sintered mixture containing two molecular weights of lime to one of silica and between one and one-tenth and one and seventy-six hundredths molecular weights of alkali metal oxide to one of alumina, and dissolving the sintered product with water and forming an alkali metal aluminate solution and separating the alumina therefrom.

8. The process of extracting alkali metal oxide and alumina from mixtures containing them, together with lime and silica in a two to one molecular ratio, and wherein the ratio of alkali metal oxide to alumina may range from one to one and seventy-six hundredths before furnacing, materials of low silica content being selected to prevent loss of alkali metal oxide and alumina by rendering less bulky the insoluble product left after alkali metal aluminate has been dissolved away from the furnaced product, which comprises furnacing the mixture, then dissolving the alkali-metal aluminate from the furnaced product in a watery solution containing enough alkali metal oxide to secure a ratio of less than one and seventy-five hundredths alkali metal oxide molecules and more than one and one-tenth to one alumina, and recovering an alkali metal compound and alumina by well known means.

9. The process of extracting alkali metal oxide and alumina from mixtures containing them, together with lime and silica in a two to one molecular ratio, lowering the molecular ratio of lime to silica below a two to one ratio in forming the mixture for furnacing and thereby making allowance for iron oxide impurities in the mixture which in a degree substitute themselves for lime in their combination with silica to form in the final insoluble product the equivalent of di-calcium silicate, and wherein the ratio of alkali metal oxide to alumina molecules may range from one to one and seventy-six hundredths before furnacing, which comprises furnacing the mixture, then dissolving the alkali-metal aluminate from the furnaced product in a watery solution containing enough alkali metal oxide to secure a ratio of less than one and seventy-five hundredths alkali metal oxide molecules and more than one and one-tenth to one alumina, and recovering an alkali metal compound and alumina by well known means.

10. In the production of alumina, an alkali metal oxide compound and a residue containing di-calcium silicate, a furnace product containing soluble alkali metal aluminate compounds from which the last named compounds can be dissolved by water alone with the production of a solution containing less than one and seventy-six hundredths molecules of alkali metal oxide and more than one and one-tenth molecules to one of alumina for the separation of alumina therefrom more economically and with greater facility than by the well known Bayer process.

11. The process of utilizing and producing alkali and alumina from native silicious minerals and mixtures thereof, with proper ingredients, which comprises grinding and mixing of said minerals and ingredients and submitting them to at least a sintering temperature in such proportions that the sintered product shall contain between one and one and seventy-six hundredths molecular weight proportions of alkali metal oxide to one of alumina and two molecular weight proportions of calcium metal oxide to one of silica, dissolving the alkali metal aluminate from said product and recovering an alkali metal compound and alumina from the solution so obtained by well known means.

12. The process of extracting alumina and a sodium compound from a formed furnace charge mixture containing limestone, a sodium compound, alumina and silica, together with such impurities as iron oxide and alkali earth metal carbonates, in such proportions that when furnaced the product shall contain two molecular weight proportions of lime to one molecular weight proportion of silica and less than one and seventy-six hundredths and more than one molecular weight proportion of sodium oxide to one molecular weight of alumina, which comprises furnacing said furnace charge mixture, dissolving from the product sodium aluminate under conditions to form a liquor containing less than one and seventy-five hundredths molecules of sodium oxide to one of alumina and more than one and one-tenth, and precipitating alumina from said liquor incidental to the manufacture of a sodium compound.

13. The process of treating mixtures and compounds having substantially the composition of leucite, which consists in grinding them with such amounts of lime that for each molecular weight of silica there shall be present two molecular weights of lime and for each molecular weight of alumina substantially one molecular weight of the alkali metal oxide, adding thereto less than seventy-six hundredths of a molecule of alkali metal carbonate, sintering the resulting mixture, leaching out the alkali metal aluminate content and treating the residual liquor.

Signed at New York in the county of New York and State of New York this 11th day of May A. D. 1920.

ALFRED H. COWLES.